US012707188B2

(12) United States Patent
Krieg

(10) Patent No.: US 12,707,188 B2
(45) Date of Patent: Aug. 11, 2026

(54) METHOD FOR CREATING A FRAILTY INDICATOR VALUE FOR A PERSON USING A HEARING INSTRUMENT AND HEARING INSTRUMENT

(71) Applicant: Sivantos Pte. Ltd., Singapore (SG)

(72) Inventor: Julius Krieg, Erlangen (DE)

(73) Assignee: Sivantos Pte. Ltd., Singapore (SG)

( * ) Notice: Subject to any disclaimer, the term of this patent is extended or adjusted under 35 U.S.C. 154(b) by 189 days.

(21) Appl. No.: 18/797,759

(22) Filed: Aug. 8, 2024

(65) Prior Publication Data

US 2025/0056148 A1 Feb. 13, 2025

(30) Foreign Application Priority Data

Aug. 8, 2023 (DE) ..................... 10 2023 207 623.3

(51) Int. Cl.

| | |
|---|---|
| ***H04R 1/10*** | (2026.01) |
| ***G08B 21/04*** | (2006.01) |
| ***H04R 25/00*** | (2006.01) |

(52) U.S. Cl.

CPC ....... *H04R 1/1091* (2013.01); *G08B 21/0446* (2013.01); *G08B 21/0492* (2013.01); *H04R 25/30* (2013.01)

(58) Field of Classification Search

CPC .. H04R 1/1091; H04R 25/30; H04R 2225/61; H04R 25/505; H04R 1/1058; H04R 25/554; H04R 25/60; G08B 21/0446; G08B 21/0492; G08B 21/043; G08B 21/0453; A61B 2562/0219; A61B 5/0531; A61B 5/1117; A61B 5/6817; A61B 5/7264; A61B 5/7275; A61B 5/1126; A61B 5/165; A61B 5/168; A61B 5/443; A61B 5/6803; G16H 50/30

See application file for complete search history.

(56) References Cited

U.S. PATENT DOCUMENTS

2020/0353250 A1 11/2020 Haddad et al.
2022/0286553 A1* 9/2022 Anderson ....... H04M 1/724094
2025/0271896 A1* 8/2025 Jumbe .................. A61B 5/0205

FOREIGN PATENT DOCUMENTS

WO 2022126024 A1 6/2022

* cited by examiner

*Primary Examiner* — Carolyn R Edwards
*Assistant Examiner* — Mark Fischer
(74) *Attorney, Agent, or Firm* — Laurence A. Greenberg; Werner H. Stemer; Ralph E. Locher

(57) ABSTRACT

A method creates a frailty indicator value for a person using a hearing instrument. At least one acceleration sensor of the hearing instrument collects first movement data relating to a stumble and/or fall. A skin sensor of the hearing instrument and/or a skin sensor of a first auxiliary device, which can be connected to the hearing instrument for data purposes, collects second moisture-related data in the immediate time surrounding the stumble or fall, in particular data relating to an electrodermal activity, which afford information about physiological and/or psychological circumstances in the time surrounding the stumble or fall. The frailty indicator value is generated on the basis of the first movement data and on the basis of the second moisture-related data.

21 Claims, 3 Drawing Sheets

METHOD FOR CREATING A FRAILTY INDICATOR VALUE FOR A PERSON USING A HEARING INSTRUMENT AND HEARING INSTRUMENT

CROSS-REFERENCE TO RELATED APPLICATION

This application claims the priority, under 35 U.S.C. § 119, of German Patent Application DE 10 2023 207 623.3, filed Aug. 8, 2023; the prior application is herewith incorporated by reference in its entirety.

FIELD AND BACKGROUND OF THE INVENTION

The invention relates to a method for creating a frailty indicator value for a person using a hearing instrument.

For people with degenerative or other muscle or nerve diseases, but also for people of old age with limited movement certainty, it is important to have precise information about the certainty of their movements in everyday life in order to be able to limit a health risk which can result from potential stumbling and falling.

While a fall can be documented per se in this case by means of acceleration sensors, data relating to the specific physiological circumstances of the fall are often missing, i.e. in particular relating to physical preconditions before the fall, but also relating to other reactions of the body to the fall. A measure that only uses data from acceleration sensors (or an inertial measurement unit) is therefore usually unsuitable in many of the above-mentioned cases to give a complete picture of the person's situation with regard to their weakness.

SUMMARY OF THE INVENTION

The invention is therefore based on the object of specifying a measure of a weakness of a person, which is particularly meaningful for people of old age or people with degenerative or other muscle or nerve diseases.

The object is achieved according to the invention by means of a method for creating a frailty indicator value for a person using a hearing instrument. Wherein at least one acceleration sensor of the hearing instrument collects first movement data relating to a stumble and/or fall. Wherein a skin sensor (in particular a skin conductivity sensor) of the hearing instrument and/or a skin sensor (in particular a skin conductivity sensor) of a first auxiliary device, which can be connected to the hearing instrument for data purposes, collect(s) second moisture-related data in the immediate time surrounding the stumble or fall, in particular data relating to an electrodermal activity of the person, which indicate a skin moisture and hereby afford information about physiological and/or psychological circumstances in the time surrounding the stumble or fall. Wherein the frailty indicator value is generated on the basis of the first movement data and on the basis of the second moisture-related data.

Advantageous embodiments, some of which are inventive on their own, are the subject of the dependent claims and the following description.

A hearing instrument generally includes in this case any apparatus which is configured to generate a sound signal from an electrical signal—which can also be given by an internal signal of the apparatus—and to supply it to the hearing of a wearer of this apparatus, i.e. in particular a headphone (e.g. as an "earbud"), a headset, data glasses with a loudspeaker, etc. However, a hearing instrument also includes a hearing aid in the narrower sense, i.e. a device for catering for a hearing impairment of the wearer, in which an input signal generated from an ambient signal by means of a microphone is processed to form an output signal and in particular amplified in a manner dependent on the frequency band, and an output sound signal generated from the output signal by means of a loudspeaker or the like is suitable, in particular, for at least partially compensating for the hearing impairment of the wearer in a user-specific manner. In this case, the wearer also represents the person for whom the frailty indicator value is created.

The first auxiliary device, which comprises the skin sensor, can be configured in particular as a smartwatch or a data wristband (in particular with a user interface), and can also be configured to control functions of the hearing instrument, in particular by way of the user interface. Preferably, the first auxiliary device is provided and configured to be worn by the wearer on one of his two arms (in particular on the wrist) during intended use.

A frailty indicator value should be understood here as meaning in particular any quantitative variable that provides information about a degree of cognitive and/or cognitive-motor impairment, dementia, a high risk of falling and/or a high probability of a decline in cognitive-motor abilities over time. The technical term frailty should be understood as meaning in particular a syndrome that is characterized by a reduced physiological reserve and reduced resistance to stressors due to a functional decline in multiple physiological systems, which is associated in particular with an increased risk of disability, hospitalization and even death.

A frailty indicator value should therefore also be understood as meaning in particular a quantitative variable that indicates a probability and/or a risk of a future fall.

In particular, the frailty indicator value can focus on an assessment of stress before a fall on the one hand, or for an assessment of stress after a fall on the other hand. The frailty indicator value may also be additionally dependent in particular on a classification of the fall event by means of the first movement data, a classification of the physiological precondition and/or reaction on the basis of the second moisture-related data, and/or the temporal ratio of relevant swings in the two data types mentioned.

The acceleration sensor here generates in particular a signal containing data relating to an acceleration in at least one spatial direction and/or a rotation around at least one axis. In particular, the data, and thus also the first movement data relating to the stumble and/or fall, are collected by means of an inertial measurement unit (IMU) of the hearing instrument, which is configured to resolve accelerations in all three spatial directions and rotations around any axis of rotation in space. In particular, the first movement data should be understood here as meaning those data from the acceleration sensor or the IMU in which a specific event of a stumble or fall is apparent.

In particular, a fall can also be triggered here by a stumble, i.e. a significant disturbance in normal walking, but the person is still able to restore the normal movement sequence of walking upon stumbling, instead of falling (i.e. hitting the ground completely). An immediate time surrounding the stumble and/or fall can be given here in particular by a period of time which begins up to one minute, preferably up to ten seconds, before the first stumble or the first detection of the fall, and ends up to five minutes, preferably up to one minute, after the end of the stumble or fall (given by the resumption of a normal walking movement or by hitting the ground).

The moisture of the skin is a reliable measure of physiological and psychological stress. It can be recorded via the electrodermal activity (EDA) by means of skin conductivity measurements, e.g. using two measurement electrodes on the skin surface, which are applied at a distance of a few millimeters from each other. In a hearing instrument, these two measurement electrodes are preferably arranged on the surface of the hearing instrument in such away that, when worn as intended, the measurement electrodes in or on the ear (e.g. behind the auricle) are in contact with the skin surface in the described manner. The second moisture-related data (e.g. data relating to the EDA) in the immediate time surrounding the stumble and/or fall can now provide information about the specific psychological and/or physiological circumstances during this period of time, which can be used to generate the frailty indicator value. Another option is an optical measurement of the moisture of the skin, in particular using an intensity of scattered and reflected light, e.g. via an electro-optical microstructure sensor.

For example, in the case of a stumble, the Achilles tendon reflex or the tibialis-posterior reflex initially begins without direct involvement of the brain, with the result that in the event of a stumble in the case of myopathy or myasthenia, a change, in particular a reduction, in the EDA, occurs comparatively late in response to the stumble. In the case of a neurodegenerative disease or general dizziness, on the other hand, a person usually already feels unsafe when walking, and so the EDA can already be reduced before a stumble or fall can be detected in the first movement data (sometimes a few seconds beforehand).

In particular, the first movement data from the at least one acceleration sensor are used to determine a first time at which a stumble and/or fall of the person begins, wherein the second moisture-related data are used to determine a second time at which the person becomes aware of a stumble and/or fall, and wherein a time interval between the first time and the second time is taken into account for the frailty indicator value. If, for instance, there is absolutely no measurable reaction of the skin moisture or the EDA, this can also be caused by a physiological anomaly, which can advantageously be reflected in the frailty indicator value.

Since, for example, the EDA is reduced by feeling stressed, it is particularly advantageous if the frailty indicator value is determined in such a way that the value increases, the more strongly and/or the longer the person's EDA is reduced after the stumble or fall.

Preferably, the skin sensor is activated on the basis of a stumble or fall detected in the first movement data, or is activated on the basis of another relevant movement situation, in particular climbing stairs, which is detected by means of the data collected by the at least one acceleration sensor. This means that it is detected, from the data from the acceleration sensor (or the IMU) by means of an appropriate evaluation, that the person is currently climbing stairs, for example, and there is therefore an increased risk of stumbling or falling, which is why the skin sensor is activated, or that an already existing stumble or fall is detected, for example from the first movement data from the acceleration sensor (or the IMU), and the skin sensor is activated immediately.

However, the skin sensor can also continuously collect data which indicate the moisture of the skin, wherein, of the data, only those which are collected in the immediate time surrounding a stumble and/or fall are stored and/or processed further as second moisture-related data for further use for the frailty indicator value. From the continuously collected data from the skin sensor, those which are related to a stumble or fall, which is detected by evaluating the first movement data, are therefore selected (in particular subsequently).

The immediate time surrounding the stumble is advantageously divided into three phases, wherein second moisture-related data are respectively collected for a first phase immediately before the stumble or fall and/or for a second phase during the stumble or fall and/or for a third phase immediately after the stumble or fall and are each compared with a reference value for the associated phase, for example using a quotient or a (possibly normalized) difference, and wherein said comparison is used for the frailty indicator value. This means in particular that, for individual phases (the first phase, depending on capture), the EDA is respectively compared separately with accordingly stored reference values, and one or more numerical values are formed from the comparison (e.g. using a mathematical function, possibly also a plurality of variables for the combination of the individual phases) and are used for the frailty indicator value.

Preferably, the first phase has a duration of between one second and one minute immediately before the first sign of a stumble or fall, and/or the second phase has a duration from the end of the first phase until an ordered walking movement is restored or until the ground is reached (that to say an end of the fall), and/or the third phase has a duration of one second to five minutes immediately after the end of the second phase. In particular, for the first phase, the second moisture-related data are captured by continuously collecting the EDA, and the relevant data from the first phase are selected on the basis of a stumble or fall detected from the first movement data.

The second moisture-related data are favorably used to detect a false-positive classification of a stumble or fall as an event relevant to the frailty indicator value. This can be affected, for example, by specifying a maximum value or the like for an EDA and/or a minimum value of a change in the EDA, which must be achieved in the immediate time surrounding the stumble/fall. If this is not the case, the event is identified as "false-positive" and therefore irrelevant, and the associated first movement data and second moisture-related data are not used for the frailty indicator value.

Advantageously, the second moisture-related data are used to determine a measure of the person's attentiveness before the stumble or fall, and the measure of attentiveness is used for the frailty indicator value. If, for example, the EDA is already reduced before the stumble or a fall, a mental tension of the person can be deduced from this. Preferably, it is then additionally assumed that the tension is associated with increased attentiveness. Falls in spite of increased attentiveness can then be specially weighted, in particular for the frailty indicator value.

It is further advantageous if the first movement data contain at least one item of information of the following kind about a stumble or fall: a strength, a duration, a height difference, a position change, a severity, and/or if the second moisture-related data contain at least one data type of the following kind with respect to the electrodermal activity over a given period of time: a maximum, a minimum, an average value, a time integral. Such data types are easy to collect and also require few resources for further processing and storage. A strength of the fall is characterized here in particular by a height difference and a change in momentum and/or duration as well as possible subsequent falls (e.g.: on a staircase), wherein a severity of a fall can depend in particular on a strength and on additional acoustic features, such as sounds of a fall or pain, which are preferably captured using an acoustic input transducer (e.g. a microphone) of the hearing instrument and are evaluated and recognized accordingly.

In a further advantageous embodiment, the frailty indicator value is determined in the immediate time surrounding the stumble or fall on the basis of the first movement data and on the basis of the second moisture-related data, and is then output and/or stored, or the first movement data and the second moisture-related data are stored together with a time index, and the frailty indicator value is generated at a later time on the basis of the stored first movement data and the second moisture-related data. In the case mentioned first, the first movement data and second moisture-related data collected in the immediate time surrounding the stumble or fall are therefore also processed immediately (i.e. in particular without a further intended delay after the collection of the data has been completed) to form the frailty indicator value which can then be output to the person via a second auxiliary device (such as a smartphone) connected to the hearing instrument, and/or stored for a longer-term review in the hearing instrument itself and/or said second auxiliary device. In the case mentioned second, it is directly the data themselves collected with regard to the stumble or fall (first movement data and second moisture-related data) which are stored together with a corresponding time marker for later further processing to form the frailty indicator value.

In the second case, the stumbling or falling event is thus clearly separated in terms of time from the process of generating the frailty indicator value. Nevertheless, in a further possible embodiment for better monitoring (for example by medical specialists), the raw data relating to the stumble or fall (i.e. first movement data and second moisture-related data) can also be stored in the case mentioned first, even if the further processing to form the frailty indicator value has already taken place immediately.

A plurality of stumbling and/or falling events are preferably taken into account for the frailty indicator value, wherein in particular an accumulation of the events over time and/or a change in a temporal distribution of the events and/or a higher weighting of recent events is/are used. A plurality of stumbling or falling events for the frailty indicator value makes it statistically more meaningful. An accumulation over time, i.e. in particular an increase in events, can then indicate a possible, generally negative development in the person, and so they should visit a doctor or the like if necessary. This accumulation or generally change in the temporal distribution of the events can be represented in the frailty indicator value if the functional design is appropriate. In particular, this can be achieved using a higher weighting of recent events, since relatively more frequent and/or more serious events (i.e. more severe falls, for example) in recent times can drive up the frailty indicator value as a result of the stronger weighting.

The frailty indicator value is preferably determined in the hearing instrument on the basis of the first movement data and on the basis of the second moisture-related data, or at least parts of the first movement data and of the second moisture-related data are transmitted from the hearing instrument (and possibly the second movement data from the first auxiliary device) to the second auxiliary device which can be connected to the hearing instrument for data purposes, wherein the frailty indicator value is calculated at least partially in the second auxiliary device. In the case mentioned first, the calculation is thus based on the data mentioned only in the hearing instrument. This is particularly advantageous in the above-mentioned temporally immediate calculation of the frailty indicator value (i.e. without further delay). In the second case, for example, the data can be preprocessed in the hearing instrument (e.g. a sorting according to relevance, a data type as described above from the first movement data or the second moisture-related data, a false-positive detection as described, the above-mentioned time division according to phases, etc.), and the data preprocessed in this manner are transmitted to the auxiliary device for the final processing to form the frailty indicator value.

The invention further specifies a hearing system which contains a hearing instrument and is configured to carry out the method described above. The hearing system may here comprise a first auxiliary device which can be connected to the hearing instrument for data purposes, such as a smartwatch or a data wristband, and has said skin sensor. The hearing system preferably further contains a second auxiliary device which can be connected to the hearing instrument for data purposes, such as a smartphone, wherein the second auxiliary device is configured to carry out parts of the method, for which in particular the second moisture-related data, for example relating to the person's EDA, are transmitted from the hearing instrument to the auxiliary device.

The hearing system according to the invention shares the advantages of the method according to the invention. The advantages stated for the method and for its developments can be applied analogously to the hearing system.

The invention further specifies a use of a hearing instrument for creating a frailty indicator value for a person, wherein at least one acceleration sensor of the hearing instrument collects first movement data relating to a stumble and/or fall, wherein a skin sensor of the hearing instrument and/or a skin sensor of a first auxiliary device, which can be connected to the hearing instrument for data purposes, collect(s) second moisture-related data in the immediate time surrounding the stumble or fall, which indicate a skin moisture and hereby afford information about physiological and/or psychological circumstances in the time surrounding the stumble or fall. The frailty indicator value is generated on the basis of the first movement data and on the basis of the second moisture-related data. If the skin sensor is arranged in the first auxiliary device, the invention mentions in particular the use of a hearing instrument and an auxiliary device, which can be connected to the latter for data purposes, to create a frailty indicator value for a person.

The use of a hearing system according to the invention shares the advantages of the method according to the invention. The advantages stated for the method and for its developments can be applied analogously to the use of the hearing system.

Other features which are considered as characteristic for the invention are set forth in the appended claims.

Although the invention is illustrated and described herein as embodied in a method for creating a frailty indicator value for a person using a hearing instrument, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

Parts and variables corresponding to one another are each provided with the same reference signs in all of the figures.

DETAILED DESCRIPTION OF THE INVENTION

Figure 1:
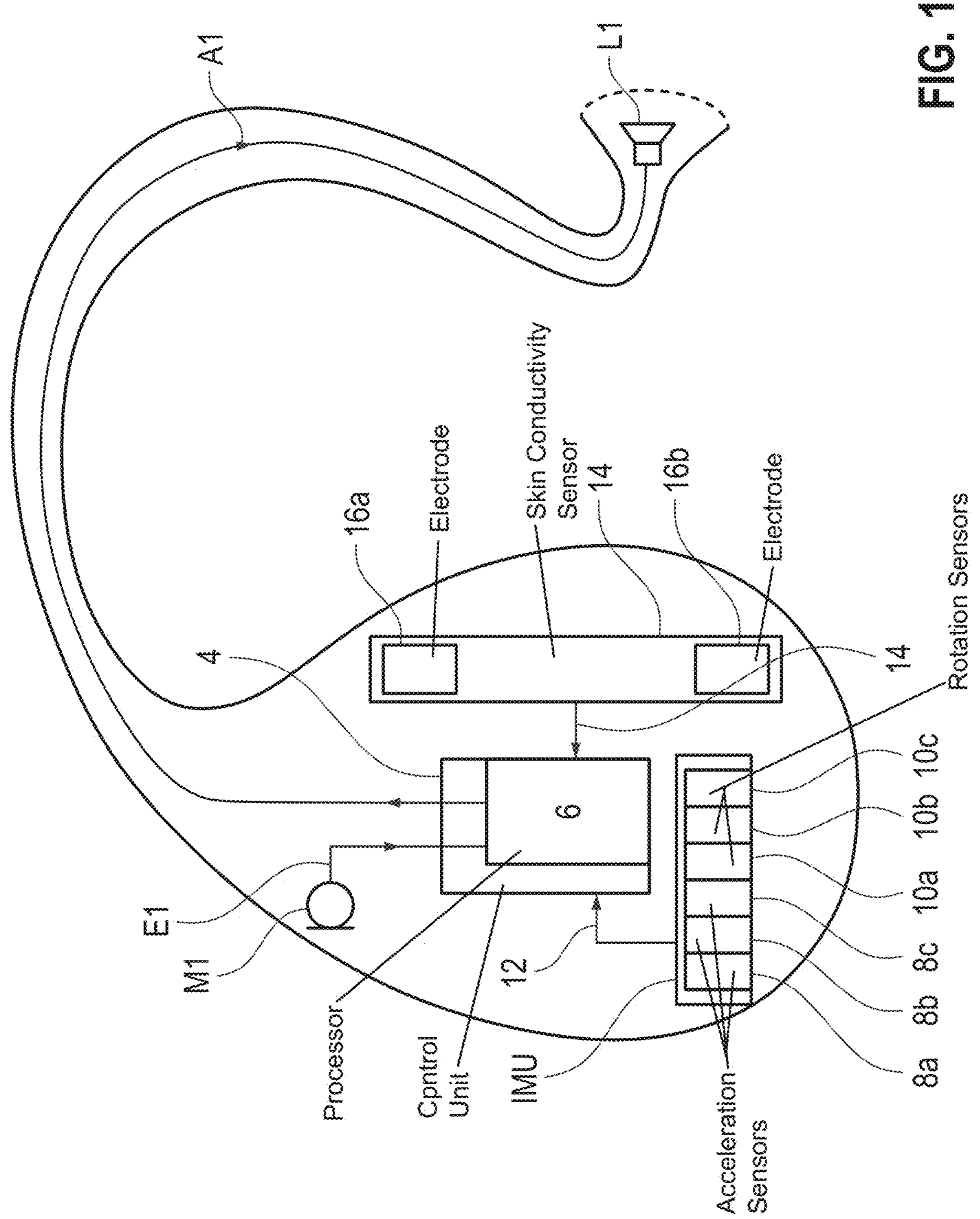
FIG. 1 is a block diagram of a hearing aid having an IMU and an EDA sensor for creating a frailty indicator value.

Referring now to the figures of the drawings in detail and first, particularly to FIG. 1 thereof, there is shown schematically illustrates a block diagram of a hearing instrument 1 which is configured in the present case as a hearing aid 2 for catering for a hearing impairment of a wearer (not illustrated). However, the hearing instrument 1 could also be a normal headphone, for example a so-called "earbud".

The hearing aid 2 has a microphone M1 which generates an input signal E1 from ambient sound that is not illustrated in any more detail. Furthermore, the hearing aid 2 has a control unit 4 with a signal processor 6, which is configured, inter alia, to process the input signal E1 in a user-specific manner according to the audiological requirement of the wearer, and in particular to amplify and/or compress it in terms of frequency band. The processing of the input signal E1 here generates an output signal A1 which is converted by a loudspeaker L1 of the hearing aid 2 into an output sound signal that is not illustrated in any more detail. Alternatively or additionally, the hearing aid may also have a bone conduction hearing device (not illustrated). The hearing aid may also have further microphones (not illustrated) which generate additional input signals from the ambient sound, which signals are included in the signal processing mentioned, wherein directional processing by means of directional microphones can also be carried out.

The hearing aid 2, which is configured in the present case as a BTE device ("Behind The Ear"), has an IMU containing three acceleration sensors 8*a-c* and three rotation rate sensors 10*a-c*. The IMU is configured to be able to characterize movements of the wearer as comprehensively and completely as possible, wherein a movement signal 12 is output from the IMU to the control unit 4. In the IMU, the raw data from the three acceleration sensors 8*a-c* and the three rotation rate sensors 10*a-c* can already be preprocessed in such a way that the movement signal 12 already indicates a specific direction of movement (and/or axis and direction of rotation in space) as well as the strength (speed) of the movement. However, the movement signal 12 may also comprise the raw data from the acceleration and rotation rate sensors 8*a-c*, 10*a-c*, with the result that the direction of movement and/or rotation and associated speed are only determined in the control unit 4.

The hearing aid 2 further has a skin sensor which is configured in the present case as a skin conductivity sensor 14 and contains a first measurement electrode 16*a* and a second measurement electrode 16*b*, and is configured to measure an EDA of the wearer when the hearing aid 2 is worn as intended, and the skin conductivity sensor 14 is activated. In particular, the two measurement electrodes 16*a/b* are embedded for this purpose in a side wall of a housing of the hearing aid to be worn behind the ear, which side wall faces the scalp or touches it at least in certain areas when worn. The skin conductivity sensor 14 is configured in particular to output a very weak voltage to the skin in contact via one of the two measurement electrodes 16*a/b*, which are preferably only a few mm apart, and to measure the voltage dropped across the few mm of skin surface via the remaining measurement electrode 16*a/b*. The skin conductivity sensor 14 is further configured to output an EDA signal 18 to the control unit 4. As an alternative (not illustrated) of the skin conductivity sensor 14, an optical sensor, e.g. an electro-optical microstructure sensor, could also be used, in particular, which allows a moisture of the skin to be determined via an intensity of reflected and scattered light.

The control unit 4 is configured to use the movement signal 12 (either preprocessed, or from the raw data) to detect whether the wearer stumbles or even falls. The data of the movement signal 12, which were captured in the immediate time surrounding the stumble or fall, are used further as first movement data (not illustrated in any more detail), in a manner yet to be described, to provide a quantitative variable which affords information about specific circumstances of the stumble or fall and possibly repeated dangers. The EDA signal 18 is also used for these specific circumstances.

Figure 2:
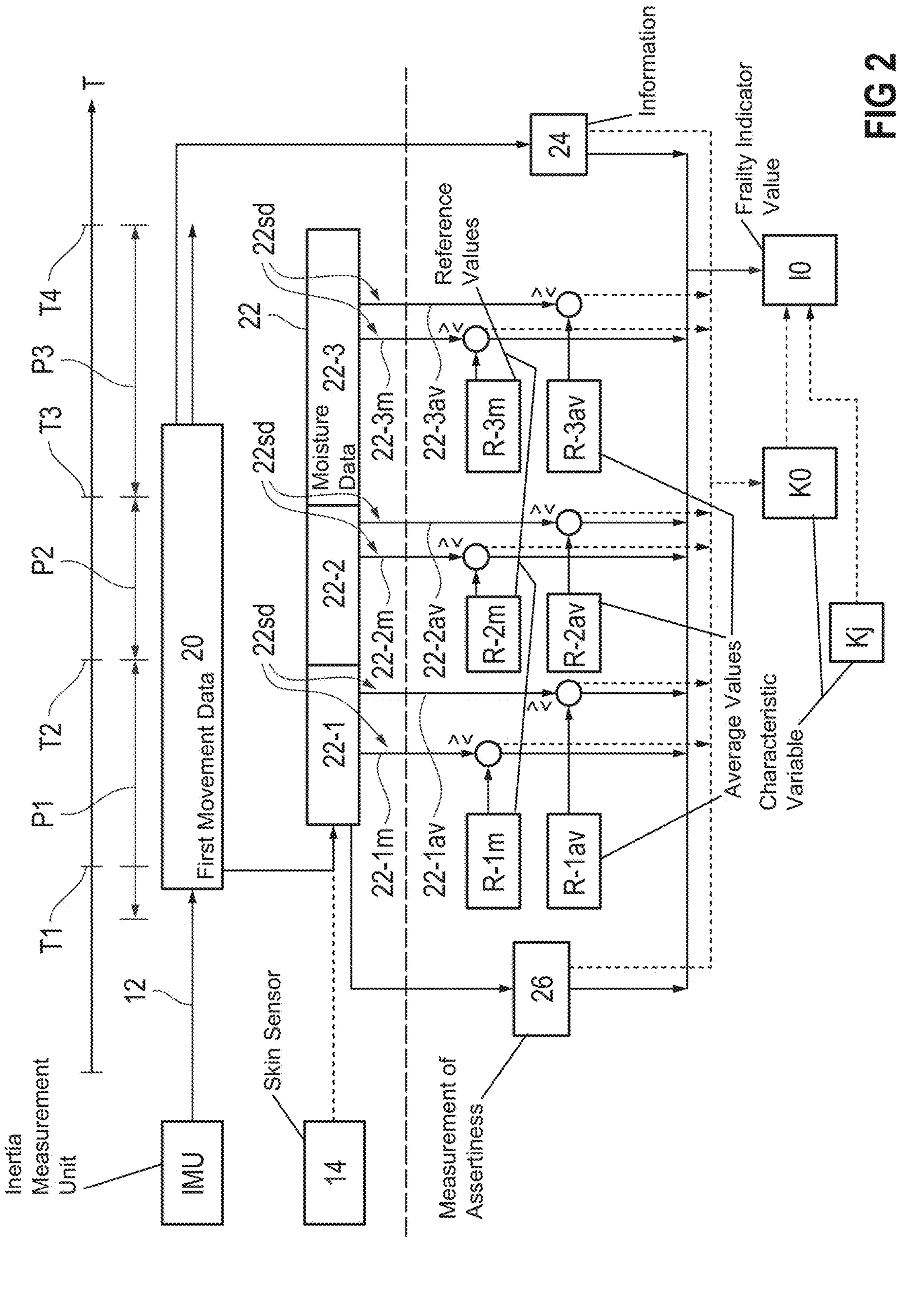
FIG. 2 is a block diagram, against a timeline, of a method for creating the frailty indicator value by means of the hearing aid according to FIG. 1.

FIG. 2 schematically illustrates a block diagram, against a timeline T, of the sequence of a method which generates a frailty indicator value I0 on the basis of the movement signal 12 and the EDA signal 18 according to FIG. 1. Processes depicted below the dashed line are no longer illustrated according to the timing given by the timeline.

At a first time T1, a user of the hearing aid 2 stumbles. This leads, in the movement signal 12 from the IMU, to correspondingly capturable data or data changes which shall be referred to as first movement data 20. These first movement data 20 are thus given by the data in the movement signal 12, either by the direction data preprocessed as described in the IMU, or by corresponding characteristic and thus evaluable swings in the raw data from the IMU.

An analysis of the movement signal 12 and thus of the first movement data 20 that is preferably performed in the control unit 4 now reveals a stumble starting at the time T1. As a result, the skin conductivity sensor 14 is activated immediately upon detection of the stumble in order to use the EDA of the user (i.e. the wearer) of the hearing aid 2 to be able to capture the more precise physiological and psychological circumstances, in particular his stress level. In this case, a very high sensitivity can be selected for the earliest possible activation of the skin conductivity sensor 14 to the effect that any signal component in the movement signal 12, which could potentially be an initial extension of a stumble, already leads to activation, so as to avoid missing early signal components with valuable information about the EDA due to excessively high confidence requirements.

The skin conductivity sensor 14 here captures, in the EDA signal 18, second moisture-related data 22 which can provide information about the physiological and psychological circumstances during stumbling and can be used, together with the first movement data 20, to generate the frailty indicator value I0.

In the present exemplary embodiment, the initial stumbling becomes a fall at a time T2, i.e. the user of the hearing aid 2 can no longer recover a normal walking movement correctly, and falls. At the time T3, which is comparatively close to the time T2, the fall is finished, since the user of the hearing aid 2 has now arrived on the ground. The fall and the end of the fall can also be captured in the first movement data 20 using characteristic data patterns (e.g. by increased acceleration in the negative z direction, which then ends abruptly) and are therefore recognized accordingly in the analysis of the first movement data 20.

In the present case, the second moisture-related data 22 relating to the fall are analyzed separately in three different time phases: A first phase P1 starts here immediately with the activation of the skin conductivity sensor 14 and thus the capture of the EDA signal 18 (thus only insignificantly after the time T1) and lasts until the start of the actual fall at time T2. A second phase P2 is given by the time during the actual fall until the impact on the ground at the time T3, and a third phase P3 immediately follows the fall at the time T3, and ends at a time T4 after a predefined period of time which can be in particular between one second and five minutes. For the individual three phases P1, P2, P3, the second moisture-related data 22-1, 22-2 and 22-3 captured during each phase are analyzed separately.

This can be effected, for example, by respectively forming one or more specific standardized data types 22*sd*, such as a maximum, a minimum, an average value or an integral, from the second moisture-related data 22-1, 22-2 and 22-3 of the EDA (which represent an electrical conductance, i.e. an inverse resistance) which are captured according to phases P1-P3. In the present case, minima 22-1*m*, 22-2*m* and 22-3*m* as well as average values 22-1*av*, 22-2*av* and 22-3*av* are formed. These standardized data types 22*sd* are now compared with respective reference values R-1*m*, R-2*m*, R-3*m* and R-1*av*, R-2*av*, R-3*av* for the relevant phases P1, P2, P3 and data types.

The comparisons, for example in the form of quotients or differences, can now be used for the frailty indicator value I0. A mathematical formulation of the frailty indicator value I0 can take into account, for example, that stress causes a decline in the EDA. If this decline is particularly severe (see minimum), or particularly long (average value, second and third phases P2, P3), the stress level is particularly high. Depending on the severity of the fall, it can now be concluded that the user of the hearing aid 2, for example, has not anticipated this fall or has not sufficiently anticipated it, and also his physical reaction to it (reflexes such as the Achilles tendon reflex) still surprises him. For this purpose, the first movement data 20 in particular can be used to determine information 24 about the fall, such as a strength, a duration, an achieved height difference and/or a change in the body position, in order to be able to capture in particular, for example, strikingly violent reactions in comparatively moderate falls. The information 24 can also be used for the frailty indicator value I0.

In addition, when constructing the frailty indicator value I0, it can be taken into account that it increases, the stronger and/or the longer the EDA determined in the second moisture-related data.

Furthermore, a measure 26 of an attentiveness of the user of the hearing aid 2 can be determined on the basis of the second moisture-related data 22. If, for example, the attentiveness (identifiable via the corresponding second moisture-related data 22-1 from the phase immediately before the fall) is significantly too low, this may indicate, for instance, a fundamentally increased risk of a fall, which can also be used when calculating the frailty indicator value I0 (i.e. in particular during the mathematical construction thereof).

Furthermore, the second moisture-related data 22 can be used to determine when the user becomes aware of the fall, i.e. notices the fall, and the time interval between this time (not illustrated) and the time T2, at which the fall begins, can also be taken into account for calculating the frailty indicator value I0 (i.e. in particular the frailty indicator value I0 can be constructed accordingly).

The first movement data 20 and second moisture-related data 22 are used in this case in the present exemplary embodiment for the frailty indicator value I0 immediately after they have been completely collected (i.e. in particular immediately after the second moisture-related data 22-3 from the third phase P3 have been collected), i.e. at a time TI0 shortly after the time T4, for instance. Here, the frailty indicator value I0 can be formed directly as a mathematical function from the said data relating to the fall at the time T2 (solid lines).

However, the frailty indicator value I0 can also use earlier events (not illustrated) such as stumbling and/or falling. Here, the frailty indicator value I0 can be formed, for example, as a running, weighted or recursive average value of a preliminary characteristic variable. The preliminary characteristic variable K0 of a current event (stumble/fall) is formed in the manner described above from the first movement data 20 and the second moisture-related data 22 (dashed lines). This is subsequently followed by averaging with comparable characteristic variables Kj of earlier events in order to form the frailty indicator value I0, or recursive averaging with the last available frailty indicator value I0, and a corresponding update. In particular, a component of an accumulation of relevant events over time can also be included here in the weighting, with the result that, for example, the frailty indicator value I0 is assigned a higher numerical value if the falls occur with increasing frequency and/or severity.

Particularly preferred alternative possible embodiments to that illustrated by means of FIG. 2 are given in particular by a continuous capture of the EDA by the skin conductivity sensor 14, wherein, when a stumble and/or fall is detected from the movement signal 12 or the first movement data 20, the associated data of the EDA signal 18 are used as second moisture-related data 22 (or 22-1, 22-2, 22-3 for the individual phases P1-P3).

In this case, the first movement data 20 and second moisture-related data 22 (respectively in the phases P1-P3), and/or the associated standardized data types 22*sd*, such as maximum, minimum, average value or integral, and/or their comparison with the associated reference values, and/or information 24 about the fall, such as strength, duration, height difference achieved or change in the body position, can be stored for a later, final further processing to form the frailty indicator value I0. Preferably, at least part of such later further processing is carried out in an auxiliary device, such as a smartphone, which can be connected to the hearing aid 2. Particularly preferably, preprocessed variables such as said standardized data 22*sd* and, if necessary, their associated reference values can also be transmitted to the auxiliary device and stored there (preferably together with a time index).

Figure 3:
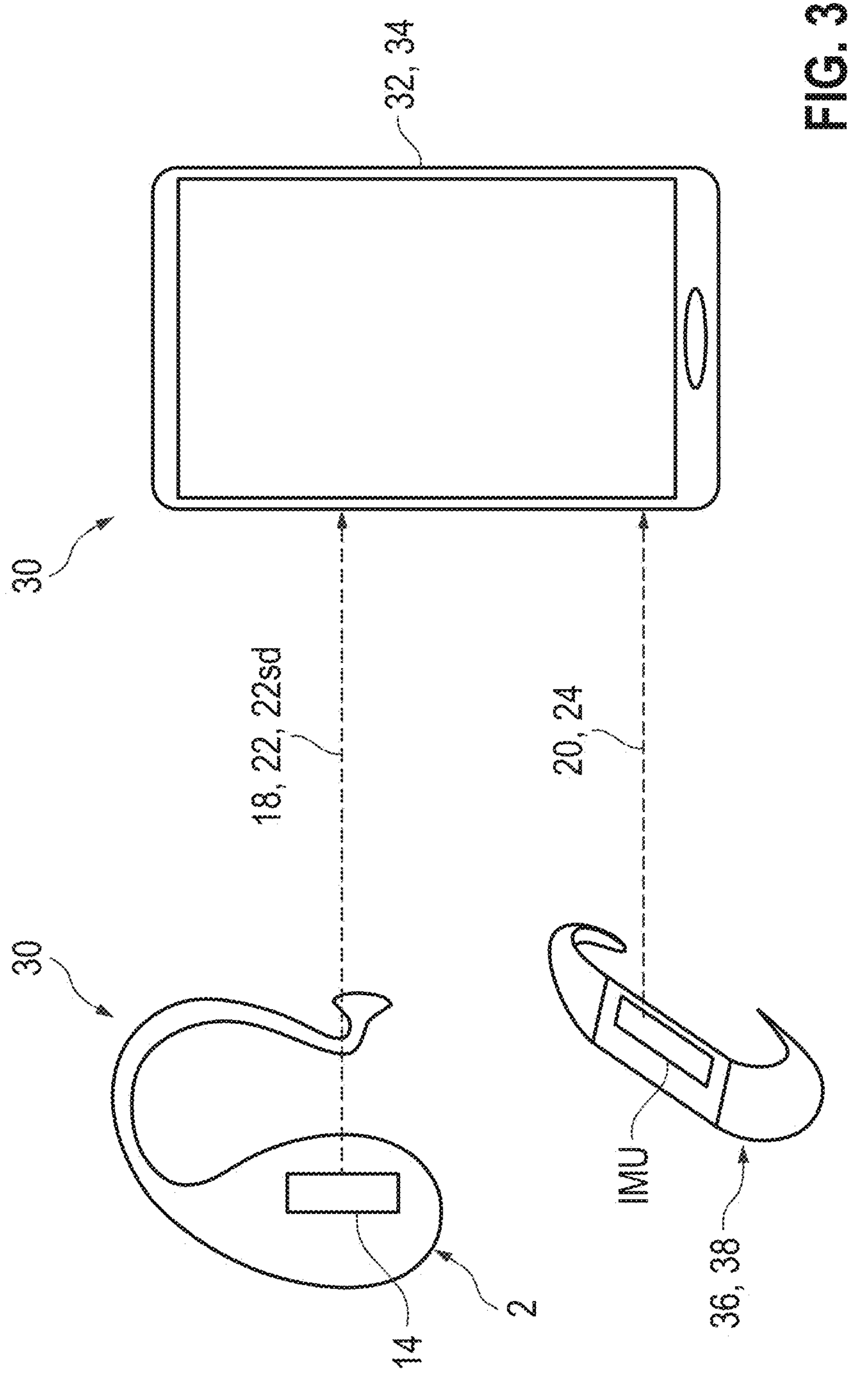
FIG. 3 is an illustration showing a hearing system having a hearing aid, a data wristband and a smartphone for carrying out an alternative embodiment of the method according to FIG. 2.

A corresponding hearing system 30 for the preferred implementation in particular of these alternative embodiments is illustrated in a schematic block diagram in FIG. 3. The hearing system 30 here comprises the hearing aid 2 and a first auxiliary device 36 which is designed as a data wristband 38 and can be used to control the "actual" hearing aid 2 and comprises the IMU in the present case. The hearing system 30 further comprises a second auxiliary device 32 which is designed as a smartphone 34. The preprocessing of the movement signal 12, on the basis of which, for example, the stumble or fall is detected, can be carried out here directly in the data wristband 38, and corresponding first movement data 20 and/or the information 24 about the stumble/fall can be transmitted to the smartphone 34. As a result, it is also possible to transmit to the hearing aid 2 a signal to activate the skin conductivity sensor 14 or (in the case of permanent activation) to transmit the data captured from the first phase P1 before the stumble/fall to the third phase P3 after the stumble/fall in the EDA signal 18 as second moisture-related data 22, if necessary after preprocessing to form the standardized data types 22*sd*, to the smartphone 34. There, the frailty indicator value I0 can then be determined from the first movement data 20 or the information 24 as well as from the second moisture-related data or the standardized data types 22*sd*. In particular, the data can be stored on the smartphone for this purpose and processed separately from the stumble/fall in terms of time to form the frailty indicator value I0, for example using the preliminary characteristic variables K0, Kj. However, even in the exemplary embodiment shown in FIG. 3, a direct, immediate calculation of the frailty indicator value I0 is possible.

Although the invention has been described and illustrated more specifically in detail through the preferred exemplary embodiment, the invention is not restricted by the disclosed examples, and other variations may be derived therefrom by a person skilled in the art without departing from the scope of protection of the invention.

The following is a summary list of reference numerals and the corresponding structure used in the above description of the invention:

1 Hearing instrument
2 Hearing aid
4 Control unit
6 Signal processor
8*a-c* Acceleration sensors
10*a-c* Rotation rate sensors
12 Movement signal
14 Skin sensor, skin conductivity sensor
16*a/b* First/second measurement electrode
18 EDA signal
20 First movement data
22 Second moisture-related data
22-1/2/3 Second moisture-related data from the first/second/third phase
22-1/2/3*m* Minima of the second moisture-related data
22-1/2/3*av* Average values of the second moisture-related data
22*sd* Standardized data types
24 Information (relating to the fall)
26 Measure of user attentiveness
30 Hearing system
32 Second auxiliary device
34 Smartphone
36 First auxiliary device
38 Data wristband
A1 Output signal
E1 Input signal
I0 Frailty indicator value
IMU Inertial measurement unit
K0, Kj Preliminary characteristic variable
L1 Loudspeaker
M1 Microphone
P1/2/3 First/second/third phase
R-1/2/3*av* Reference values (for the average values)
R-1/2/3*m* Reference values (for the minima)
T Timeline
T1-4 Times

The invention claimed is:

1. A method for creating a frailty indicator value for a person using a hearing instrument, which comprises the steps of:

collecting, via at least one acceleration sensor of the hearing instrument, first movement data relating to a stumble and/or fall;

collecting, via a skin sensor of the hearing instrument and/or a skin sensor of a first auxiliary device, being connected to the hearing instrument for data purposes, second moisture-related data in an immediate time surrounding the stumble or the fall, which indicate a skin moisture, and thereby afford information about physiological and/or psychological circumstances in time surrounding the stumble or the fall; and generating the frailty indicator value on a basis of the first movement data and on a basis of the second moisture-related data.

2. The method according to claim 1, which further comprises:

collecting the first movement data by means of an inertial measurement unit (IMU) of the hearing instrument; and/or collecting the second moisture-related data as data relating to an electrodermal activity by means of a skin conductivity sensor as the skin sensor; and/or collecting the second moisture-related data as data relating to a skin reflectivity by means of an optical sensor as the skin sensor.

3. The method according to claim 2, which further comprises determining the frailty indicator value such that the frailty indicator value increases, more strongly and/or a longer a person's electrodermal activity is reduced after the stumble or the fall.

4. The method according to claim 2, wherein:

the first movement data contain at least one item of information of a following kind about the stumble or the fall: a strength, a duration, a height difference, a position change, and a severity; and/or the second moisture-related data contain at least one data type of a following kind with respect to electrodermal activity over a given period of time: a maximum, a minimum, an average value, and a time integral.

5. The method according to claim 1, which further comprises activating the skin sensor on a basis of the stumble or the fall detected in the first movement data, or is activated on a basis of another relevant movement situation which is detected by means of the first movement data collected by the at least one acceleration sensor.

6. The method according to claim 1, wherein the skin sensor continuously collects data which indicate the moisture of the skin, wherein, of the data, only those which are collected in the immediate time surrounding the stumble and/or the fall are stored and/or processed further as the second moisture-related data.

7. The method according to claim 1, wherein:

the second moisture-related data are respectively collected for a first phase immediately before the stumble or the fall and/or for a second phase during the stumble or the fall and/or for a third phase immediately after the stumble or the fall and are each compared with a reference value for an associated phase; and a comparison is used for determining the frailty indicator value.

8. The method according to claim 7, wherein:

the first phase has a duration of between one second and one minute immediately before a first sign of the stumble until the stumble; and/or the second phase has a duration from an end of the first phase until an ordered walking movement is restored or until ground is reached; and/or the third phase has a duration of one second to five minutes immediately after an end of the second phase.

9. The method according to claim 1, which further comprises using the second moisture-related data to detect a false-positive classification of the stumble or the fall as an event relevant to the frailty indicator value.

10. The method according to claim 1, which further comprises using the second moisture-related data to determine a measure of an attentiveness of the person before the stumble or the, and the measure of the attentiveness is used for determining the frailty indicator value.

11. The method according to claim 1, which further comprises:

using the first movement data from the at least one acceleration sensor to determine a first time at which the stumble and/or the fall of the person begins;

using the second moisture-related data to determine a second time at which the person becomes aware of the stumble and/or the fall; and taking a time interval between the first time and the second time into account for determining the frailty indicator value.

12. The method according to claim 1, which further comprises generating a probability and/or a risk of a future fall as the frailty indicator value.

13. The method according to claim 1, which further comprises:

determining the frailty indicator value in the immediate time surrounding the stumble or the fall on a basis of the first movement data and on a basis of the second moisture-related data, and is then output and/or stored; or storing the first movement data and the second moisture-related data together with a time index, and the frailty indicator value is generated at a later time on a basis of stored first movement data and the second moisture-related data.

14. The method according to claim 13, which further comprises:

taking into account a plurality of stumbling and/or falling events for the determining the frailty indicator value; and using an accumulation of the stumbling and/or falling events over time and/or a change in a temporal distribution of the stumbling and/or falling events and/or a higher weighting of recent stumbling and/or falling events.

15. The method according to claim 1, which further comprises:

determining the frailty indicator value on a basis of the first movement data and on a basis of the second moisture-related data in the hearing instrument; or transmitting at least parts of the first movement data and/or of the second moisture-related data from the hearing instrument to a second auxiliary device, and the frailty indicator value is calculated at least partially in the second auxiliary device.

16. The method according to claim 1, which further comprises calculating the frailty indicator value at least partially by means of an artificial neural network which uses the first movement data and/or the second moisture-related data and/or preprocessed data derived therefrom as input variables.

17. The method according to claim 1, which further comprises collecting the second moisture-related data by the skin sensor of the first auxiliary device which is connected to the hearing instrument for data purposes and is worn on an arm of the person during intended use.

18. A hearing system, comprising:

a hearing instrument configured to carry out the method according to claim 1.

19. The hearing system according to claim 18, further comprising:

a first auxiliary device connectable to said hearing instrument for data purposes and having said skin sensor; and/or a second auxiliary device connectable to said hearing instrument for data purposes, wherein said second auxiliary device is configured to perform at least one of:

collecting, via said at least one acceleration sensor of said hearing instrument, the first movement data relating to the stumble and/or fall;

collecting, via said skin sensor of said hearing instrument and/or said skin sensor of said first auxiliary device, being connected to said hearing instrument for data purposes, the second moisture-related data in the immediate time surrounding the stumble or the fall, which indicate the skin moisture, and thereby afford the information about the physiological and/or psychological circumstances in the time surrounding the stumble or the fall; or generating the frailty indicator value on the basis of the first movement data and on the basis of the second moisture-related data.

20. The hearing system according to claim 18, wherein said first auxiliary device, which contains said skin sensor, is configured to be worn on an arm of the person during intended use.

21. A method of using a hearing instrument to create a frailty indicator value for a person, which comprises the steps of:

collecting, via at least one acceleration sensor of the hearing instrument, first movement data relating to a stumble and/or fall;

collecting, via a skin sensor of the hearing instrument and/or a skin sensor of a first auxiliary device, being connected to the hearing instrument for data purposes, second moisture-related data in an immediate time surrounding the stumble or the fall, which indicate a skin moisture, and thereby afford information about physiological and/or psychological circumstances in a time surrounding the stumble or the fall; and generating the frailty indicator value on a basis of the first movement data and on a basis of the second moisture-related data.

* * * * *